Oct. 9, 1945.　　　J. J. CAMPODONICO　　　2,386,541
MULTISPEED GEAR TRANSMISSION
Filed Oct. 15, 1943　　　2 Sheets-Sheet 2
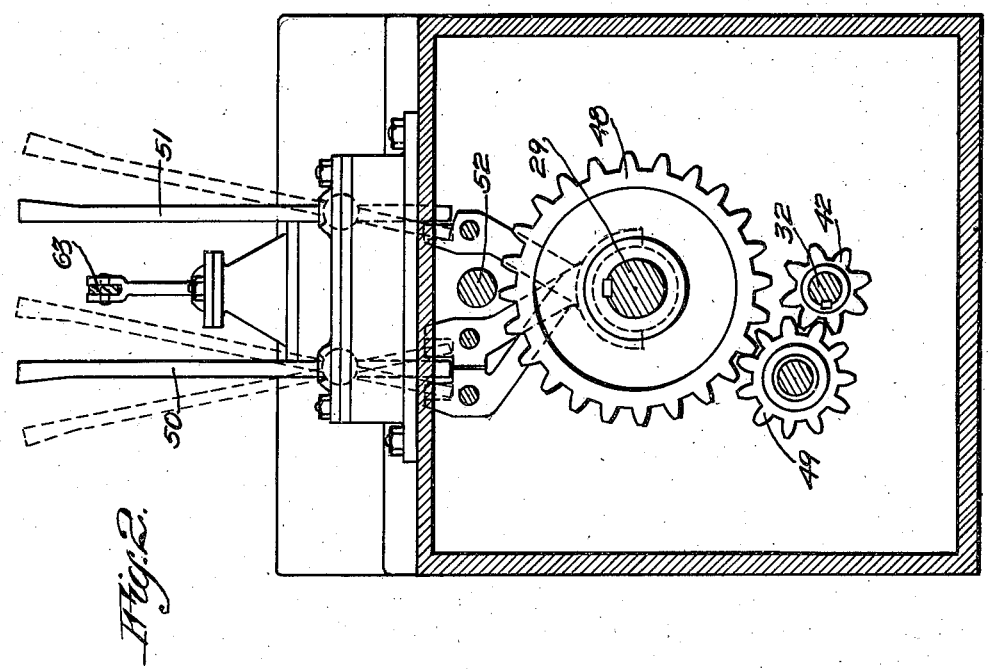
INVENTOR.
John J. Campodonico.
BY
Castberg & Roemer Patented Oct. 9, 1945

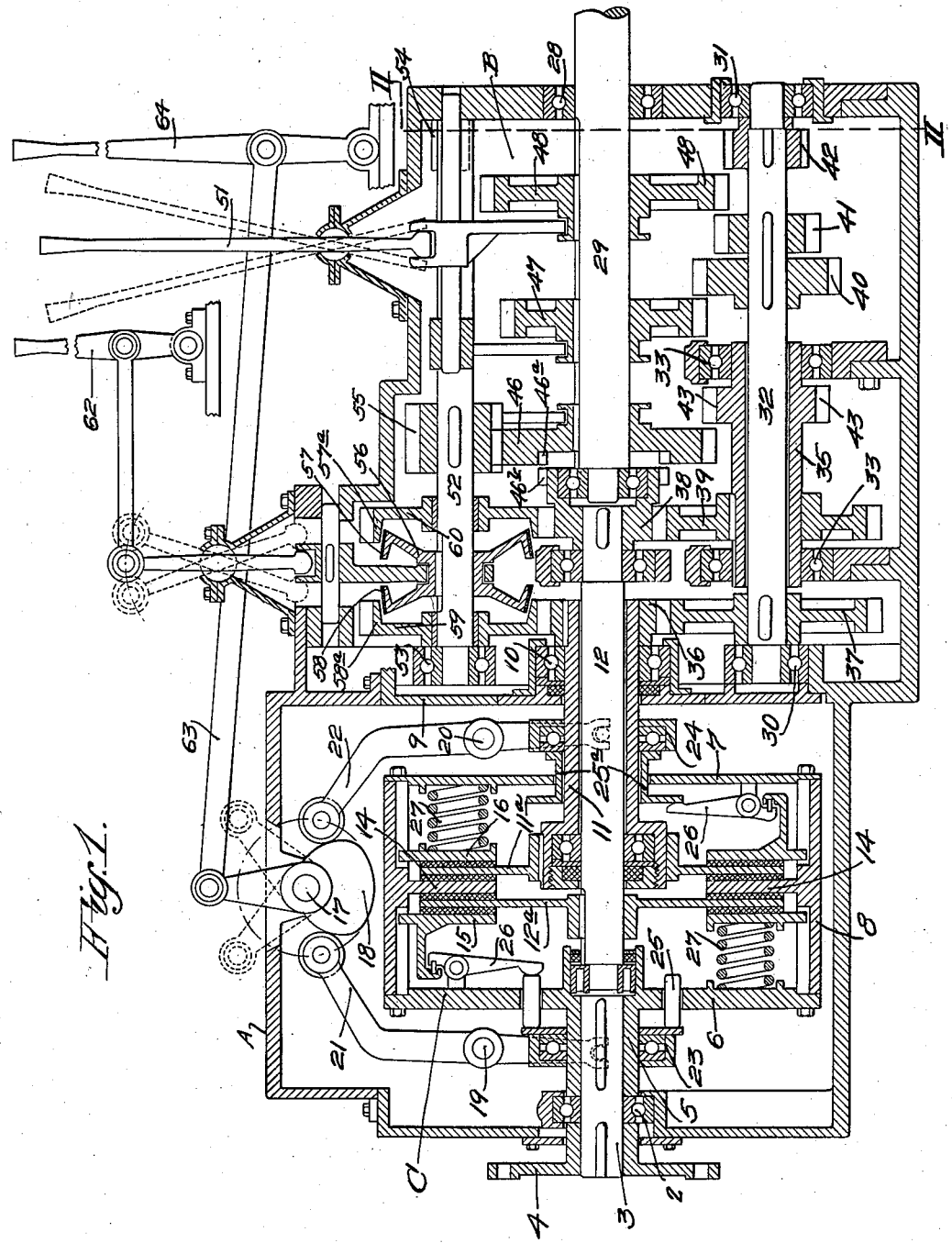

2,386,541

UNITED STATES PATENT OFFICE 2,386,541

MULTISPEED GEAR TRANSMISSION

John J. Campodonico, Stockton, Calif.

Application October 15, 1943, Serial No. 506,446

9 Claims. (Cl. 74—330)

This invention relates to a multi speed gear transmission, and particularly to a modification of the gear transmission disclosed in my co-pending application entitled "Gear transmission" filed September 17, 1943, Serial No. 502,847.

The object of the present invention is to provide a multi-speed gear transmission which is substantially identical to the transmission disclosed in my above identified co-pending application in so far as function, operation and results obtained are concerned, but which differs in the general assembly and arrangement of parts to such an extent that a more compact and space-saving structure results.

The invention more specifically stated, comprises a pair of countershafts, one in the form of a sleeve and the other in the form of a shaft which extends through and beyond the sleeve, a plurality of gears secured on each countershaft, a driven shaft, a plurality of gears splined and slidably mounted on the driven shaft, means for meshing one or more of the slidably mounted gears on the driven shaft with gears on the respective countershafts, means for reversing the driven shaft, and means for selectively transmitting motive power directly to the driven shaft or to one or the other of the countershafts to drive the driven shaft either ahead or reversed and at predetermined different speeds.

The gear transmission is shown by way of illustration in the accompanying drawings, in which:

Fig. 1 is a central, vertical, longitudinal section of the transmission; and

Fig. 2 is a vertical cross-section taken on line 2—2 of Fig. 1.

Referring to the drawings in detail, and particularly Fig. 1, A indicates a case or housing, in one end of which is mounted a multiple speed gear transmission unit, generally indicated at B, and in the opposite end of which is mounted a compound clutch unit, generally indicated at C. Journaled as at 2, adjacent the clutch unit, is a shaft 3, one end of said shaft having a coupling 4, whereby it is connected with an engine or any other suitable motive power. On the opposite end is secured a hub 5 and forming a part of said hub and driven by the hub is a clutch housing, consisting of end plates 6 and 7 and an intermediate housing 8.

Formed between the clutch unit and the gear transmission unit is a partition or cross wall 9 and journaled therein as at 10 is a sleeve shaft 11, and within the same a shaft 12. The sleeve shaft 11 carries a clutch member 11a and a shaft 12, and a clutch member 12a. These clutches are in the form of plates and they cooperate with a central plate 14 forming a part of the housing 8 and with a pair of sliding plates 15 and 16. Mounted above the clutch unit and interiorly of the housing A is a shaft 17, on which is formed a cam 18. Pivotally mounted at opposite ends of the clutch unit, as at 19 and 20, are a pair of clutch actuating arms 21 and 22. Their upper ends are provided with rollers, which engage the cam 18, while their lower ends are forked to straddle a pair of slidably mounted thrust collars 23 and 24. These collars through pins 25 and a sleeve 25a, actuate levers 26, pivoted within the clutch unit, and as the levers 26 are connected with clutch plates 15 and 16, it can be seen that when the cam is swung in one direction, one or another of the clutch plates 15 or 16 will be thrown out of engagement, while one or another of said plates will be thrown into engagement by means of helical compression springs 27. Thus, if power is transmitted through the coupling 4 to shaft 3, said shaft will cause rotation of the clutch unit or the housing C. If the cam 18 assumes the position shown in Fig. 1, both clutch members 11a and 12a will remain idle, as the cooperating plates 15 and 16 are held out of contact therewith. On the other hand, if the cam 18 is swung towards the right, it will swing the clutch arm 22 to the right, thereby further disengaging the clutch 11a. At the same time the clutch arm 21 will also swing to the right, thereby permitting the helical springs 27 to cause engagement of the clutch plate 15 with the clutch member 12a, thus transmitting power to the shaft 12. Conversely, by swinging the cam 18 in the left hand direction, clutch members 12a and 15 will be disengaged and the clutch members 11a and 16 will be engaged and power will then be transmitted to the sleeve shaft 11. Thus, the clutch unit may transmit power to either of the shafts 11 or 12 or it may assume a neutral position with relation to said shafts. The shafts 11 and 12 will hereinafter be referred to as drive shafts.

The drive shafts 11 and 12, as previously stated, are journaled in one end of the gear transmission unit, as indicated at 10. Journaled in the opposite end of this unit in the bearing 28 and in alignment with the shaft 12 is a driven or propeller shaft 29. Journaled as at 30 and 31 below the shafts 12 and 29 is a countershaft 32, and surrounding said shaft and journaled in a bearing 33 is a countershaft 35, which is in the form of a sleeve. The countershaft 32 is driven from the drive or sleeve shaft 11 through gears 36 and 37 and the counter or sleeve shaft 35 is driven from the drive shaft 12 through gears 38 and 39. Secured on the countershaft 32 are gears 40, 41 and 42, and similarly secured on the sleeve or countershaft 35 is a gear 43. Slidably mounted on the driven shaft 29 are three gears generally indicated at 46, 47 and 48. Gear 42 is in continuous mesh with an intermediate or reversing gear 49, and as gear 48 on the driven shaft is slidably mounted, it may mesh either with the gear 49 or the gear 41. The gear 47 will mesh with one gear only, to wit, the gear 40, and the gear 46 on the driven shaft will mesh with one gear only, to wit, the gear 43. The gear 46, however, has a jaw clutch 46a formed on one side thereof, and this is adapted to engage a complementary jaw clutch member 46b forming a part of the gear 38.

With the clutch and gear arrangement here shown, it becomes possible to transmit power from the clutch C through shaft 12 directly to the shaft 29, or in other words, to transmit a direct or high drive. It also becomes possible to transmit power through either counter shaft to the driven shaft through gears of different speed ratio, or in other words, to transmit power from either counter shaft to the driven shaft at different predetermined speeds; and it also becomes possible to transmit a reverse drive through the counter shaft 32 to the driven shaft.

If the transmission here shown is mounted, for instance in a tractor, and the tractor is standing still, gear 48 will be shifted into mesh with the gear 41—which is the lowest ratio gear through which power may be transmitted. The second speed is transmitted by sliding gear 46 into mesh with the gear 43. The third speed is transmitted by sliding the gear 47 into mesh with the gear 40. And high or direct drive is transmitted by engaging the jaw clutch members 46a and 46b. Two gear shifting levers such as indicated at 50 and 51 are required. The lever 51 controls the shifting of the gear 48 which meshes either with the low gear drive 41 or the reverse idler 49, and lever 50 controls the shifting of two gears, to wit, the gear 47, which meshes with the gear 40, and it also controls the gear 46, which meshes either with the gear 43 or the jaw clutch member 46b. When the tractor or other vehicle in which the transmission is mounted is standing still, the operator may go ahead by moving the gear shift lever 51 to mesh gear 48 with gear 41 or he may reverse by meshing the gear 48 with the gear 49. If he is to go ahead, he will obviously mesh gear 48 with the gear 41, and before throwing in the clutch to go ahead, he may also grasp the gear shift lever 50 and mesh the gear 46 with the gear 43 and he may then engage clutch section 11a to drive the sleeve shaft 11 and the counter shaft 32 to transmit power through the gears 41 and 48 to the propeller shaft to go ahead and when he gains sufficient speed or momentum, he may disengage the clutch 11a and engage the clutch 12a to transmit power through the shaft 12 and gears 38 and 39 to drive the counter or sleeve shaft 35 and through gears 43 and 46 the propeller shaft 29. Thus, he may transfer from low to second without shifting gears and he may drive in second while the gears 41 and 48 remain in mesh. For instance, the tractor may be hauling a gang of plows over a more or less hilly section of land where the grade or incline in some places is too much of a load for second gear drive. In that case he merely reverses the clutch to go into low, and if the incline decreases, he can switch back to second and so on without shifting gears. If he desires to go from second into third, it is essential to spin or synchronize the shaft 32 so that he can mesh the gears 47 or 40 through which third drive is transmitted without the clashing of gears. To accomplish this a standard form of synchronizing mechanism may be employed. In this instance shaft 52 represents the synchronizing shaft. It is journaled in bearings 53 and 54. It is driven from the propeller shaft through gear 46 which meshes with the gear 55, secured on the synchronizing shaft 52. Also keyed to the shaft 52 is a compound clutch 56. This clutch has two clutch faces indicated at 57 and 58 adapted to engage complementary clutch faces 57a and 58a. The clutch face 58a is formed on the side of a gear 59 which is freely rotatable on shaft 52, but which meshes gear 36. The clutch face 57a is formed on the side of a gear 60, and this is also freely rotatable on shaft 52, but it meshes with the gear 38. The clutch 56 is splined and slidably mounted on shaft 52. If moved to engage the clutch face 57, it will spin the gear 60 and thereby the gears 36 and 37, and shaft 32. Hence, if it is desired to shift from second to third speed, shaft 32 is spun by the clutch members 57 and 57a until the gear 40 synchronizes with the gear 47 when this may be moved into mesh and when it has been meshed, clutch 12a may be disengaged and clutch 11a engaged so as to transmit power through the sleeve or counter shaft 11 and gears 36 and 37 to shaft 32, which in turn drives through gears 40, and 47 drives the driven shaft 29. The sleeve or counter shaft may similarly be spun to synchronize meshing of the gears 43 and 46 and to synchronize meshing of the jaw clutch members 46a and 46b when a direct drive is to be transmitted.

The synchronizing clutch 56 may be actuated by a foot pedal as shown in my co-pending application previously referred to, or it may be actuated by a lever such as shown at 62. The clutch 18 which transmits motive power either to one or another of the clutch members 11a or 12a may also be actuated in any suitable manner or as here shown through a link 63 connected with a lever 64. In view of the foregoing it will be noted that the entire mechanism is controlled by four levers, to wit, the single clutch lever 64, the synchronizing lever 62, and the gear shifting levers 50 and 51. In my copending application already referred to, I employed two counter shafts, one disposed on each side of the driven shaft 29. In the present instance, I also employ two counter shafts, but they are disposed below the driven shaft 29 and one surrounds the other in the form of a sleeve shaft such as shown at 35. In my co-pending application the gears on the counter shafts are slidably mounted, and the gears on the driven shaft are keyed or fixed. In this instance the gears are keyed or fixed to the counter shafts while the gears on the driven shafts are slidable to move them into and out of mesh with cooperative gears on the respective counter shafts. By the arrangement here shown, the construction is somewhat simplified, but the important feature is that the structure as a whole can be made much more compact, and when space saving is essential, this is an obvious advantage. In the present structure, two speeds are transmitted from each counter shaft to the driven shaft, but where space permits, the transmission case may be elongated and additional gears may be added to provide further speeds. For instance in my co-pending application six speeds are shown in one instance, and in the other instance five speeds. While these and other features of the present invention have been more or less specifically described and illustrated, I wish it understood that various changes in form and proportion may be resorted to within the scope of the appended claims, and that the materials and finish of the several parts employed may be such as the experience and judgment of the manufacturer may dictate or varying uses may demand.

Having thus described my invention, what I claim and desire to secure by Letters Patent is:

1. In a transmission of the character described, a housing, a tubular counter shaft journaled in the housing, a second counter shaft extending therethrough and journaled in the housing, a driven shaft journaled in the housing, means for transmitting power from either counter shaft to drive the driven shaft, and means for selectively transmitting motive power to either counter shaft.

2. In a transmission of the character described, a housing, a tubular counter shaft journaled in the housing, a second counter shaft extending therethrough and journaled in the housing, a driven shaft journaled in the housing, means for transmitting power from either counter shaft to drive the driven shaft, means for reversing the driven shaft, and means for selectively transmitting motive power to either counter shaft.

3. In a transmission of the character described, a housing, a tubular counter shaft journaled in the housing, a second counter shaft extending therethrough and journaled in the housing, a driven shaft journaled in the housing, a plurality of gears secured on both counter shafts, a plurality of gears splined and slidably mounted on the driven shaft, means for selectively meshing gears on the driven shaft with gears on the counter shafts, and means for selectively transmitting motive power to either counter shaft.

4. In a transmission of the character described, a housing, a tubular counter shaft journaled in the housing, a second counter shaft extending therethrough and journaled in the housing, a driven shaft journaled in the housing, a plurality of gears secured on both counter shafts, a plurality of gears splined and slidably mounted on the driven shaft, means for selectively meshing gears on the driven shaft with gears on the counter shafts, means for reversing the driven shaft, and means for selectively transmitting motive power to either counter shaft.

5. In a transmission of the character described, a housing, a tubular counter shaft journaled in the housing, a second counter shaft extending therethrough and journaled in the housing, a driven shaft journaled in the housing, a plurality of gears secured on both counter shafts, a plurality of gears splined and slidably mounted on the driven shaft, means for meshing one gear on the driven shaft with a gear on the first named counter shaft, means for meshing a second gear on the driven shaft with a gear on the second named counter shaft, and means for transmitting power selectively through either counter shaft to drive the driven shaft.

6. In a transmission of the character described, a housing, a tubular counter shaft journaled in the housing, a second counter shaft extending therethrough and journaled in the housing, a driven shaft journaled in the housing, a plurality of gears secured on both counter shafts, a plurality of gears splined and slidably mounted on the driven shaft, means for meshing one gear on the driven shaft with a gear on the first named counter shaft, means for meshing a second gear on the driven shaft with a gear on the second named counter, means for reversing the driven shaft, and means for transmitting power selectively through either counter shaft to drive the driven shaft.

7. In a transmission of the character described, a housing, a pair of drive shafts, a pair of counter shafts and a driven shaft journaled in the housing, one of said counter shafts being a tubular shaft and the other counter shaft extending through and beyond the tubular shaft, means for transmitting power from one drive shaft to the tubular counter shaft, means for transmitting power from the other drive shaft to the second named counter shaft, a plurality of gears secured on each counter shaft, a plurality of gears splined and slidably mounted on the driven shaft, and means for selectively transmitting a direct drive from one of the drive shafts to the driven shaft or for selectively meshing gears on the driven shaft with gears on the counter shafts.

8. In a transmission of the character described, a housing, a pair of drive shafts, a pair of counter shafts and a driven shaft journaled in the housing, one of said counter shafts being a tubular shaft and the other counter shaft extending through and beyond the tubular shaft, means for transmitting power from one drive shaft to the tubular counter shaft, means for transmitting power from the other drive shaft to the second named counter shaft, a plurality of gears secured on each counter shaft, a plurality of gears splined and slidably mounted on the driven shaft, means for selectively transmitting a direct drive from one of the drive shafts to the driven shaft or for selectively meshing gears on the driven shaft with gears on the counter shafts, and means for reversing the driven shaft.

9. In a transmission of the character described, a housing, a pair of drive shafts, a pair of counter shafts and a driven shaft journaled in the housing, one of said counter shafts being a tubular shaft and the other counter shaft extending through and beyond the tubular shaft, means for transmitting power from one drive shaft to the tubular counter shaft, means for transmitting power from the other drive shaft to the second named counter shaft, a plurality of gears secured on each counter shaft, a plurality of gears splined and slidably mounted on the driven shaft, means for selectively transmitting a direct drive from one of the drive shafts to the driven shaft or for selectively meshing gears on the driven shaft with gears on the counter shafts, a common drive clutch for the respective drive shafts, and means for selectively transmitting power from said clutch to either drive shaft.

JOHN J. CAMPODONICO.